(12) United States Patent
Choi et al.

(10) Patent No.: US 8,238,421 B2
(45) Date of Patent: Aug. 7, 2012

(54) APPARATUS AND METHOD FOR ESTIMATING COMPRESSION MODES FOR H.264 CODINGS

(75) Inventors: Yung-Ho Choi, Gyeonggi-do (KR); Yong-Goo Kim, Seoul (KR)

(73) Assignees: Libertron Co., Ltd., Seoul (KR); Konkuk University Industrial Cooperation Corp., Seoul (KR)

( * ) Notice: Subject to any disclaimer, the term of this patent is extended or adjusted under 35 U.S.C. 154(b) by 507 days.

(21) Appl. No.: 12/307,747

(22) PCT Filed: Jul. 6, 2007

(86) PCT No.: PCT/KR2007/003297
§ 371 (c)(1),
(2), (4) Date: Oct. 30, 2009

(87) PCT Pub. No.: WO2008/004837
PCT Pub. Date: Jan. 10, 2008

(65) Prior Publication Data
US 2010/0046614 A1 Feb. 25, 2010

(30) Foreign Application Priority Data
Jul. 7, 2006 (KR) .................. 10-2006-0063845

(51) Int. Cl.
*H04N 11/04* (2006.01)
(52) U.S. Cl. ......... 375/240.02; 375/240.13; 375/240.12; 375/240.24
(58) Field of Classification Search ............. 375/240.24, 375/240.13, 240.12
See application file for complete search history.

(56) References Cited

U.S. PATENT DOCUMENTS

| 6,167,162 | A * | 12/2000 | Jacquin et al. | 382/251 |
|---|---|---|---|---|
| 7,596,279 | B2 * | 9/2009 | Sugimoto et al. | 382/238 |
| 7,606,308 | B2 * | 10/2009 | Holcomb et al. | 375/240.16 |
| 2001/0022856 | A1 * | 9/2001 | Matsumoto | 382/238 |
| 2005/0163216 | A1 * | 7/2005 | Boon et al. | 375/240.12 |
| 2006/0088103 | A1 * | 4/2006 | Kanehara | 375/240.16 |
| 2006/0209952 | A1 * | 9/2006 | Tanizawa et al. | 375/240.03 |

OTHER PUBLICATIONS

C. Sampath Kannangara, et al; "Low-Complexity Skip Prediction for H.264 Through Langrangian Cost Estimation", IEEE Transactions on Circuits and Systems for Video Technology, vol. 16, No. 2, Feb. 2006, pp. 202-208.

Qionghai Dai, et al; "Fast Mode Decision for Inter Prediction in H.264", 2004 International Conference on Image Processing, 2004, ICIP'04, Oct. 24-27, 2004 pp. 119-122 vol. 1.

(Continued)

*Primary Examiner* — Christopher S Kelley
*Assistant Examiner* — Jonathan Torchman
(74) *Attorney, Agent, or Firm* — Ladas & Parry LLP

(57) ABSTRACT

The present invention relates to technology of compressing large image data in order to effectively use a storage medium and efficiently use a communication medium in an image data compression technique field, and more particularly, to fast compression mode calculation in H.264. The present invention provides an H.264 compression mode estimation apparatus comprising: a macroblock image characteristic calculator calculating a macroblock image characteristic from macroblock image information; a macroblock mode estimator which comprises mode history tables and a table management unit managing these tables, in order to estimate a mode of a current macroblock from macroblock coordinates; and a mode estimation optimization judgment unit calculating RD-cost for the mode estimation and selecting an optimal mode in order to prevent the spread of errors of the estimated mode.

21 Claims, 9 Drawing Sheets

OTHER PUBLICATIONS

Hyungjoon Kim, et al; "Low-Complexity Macroblock Mode Selection for H.264/AVC Encoders", 2004 IEEE International Conference on Image Processing (ICIP), pp. 765-768, Oct. 24-27, 2004, vol. 2.

Andy C. Yu, et al; "Advanced Block Size Selection Algorithm for Inter Frame Coding in H.264/MPEG-4 AVC", Presented at 2004 International Conference on Image Processing, Oct. 24-27, 2004, pp. 95-98, vol. 1.

Lidong Xu, et al; Fast Mode Decision for Inter Frames in H.264/AVC, IEEE International Symposium on Communications and Information Technology, 2005. ISCIT 2005, Oct. 12-14, 2005, pp. 418-421.

Dongming Zhang, et al; "Fast Inter Frame Encoding Based on Modes Pre-Decision in H.264", IEEE International Conference on Multimedia and Expo, 2005. ICME 2005, Jul. 6-8, 2005, 4 pages.

* cited by examiner (a)

(b)

(c)

APPARATUS AND METHOD FOR ESTIMATING COMPRESSION MODES FOR H.264 CODINGS

TECHNICAL FIELD

The present invention relates to technology of compressing large image data in order to effectively use a storage medium and efficiently use a communication medium in an image data compression technique field. Examples of such technology include MPEG2, MPEG4, H.263, H.264, etc. The present invention relates to fast compression mode in H.264 which is one of the latest defined standards. In more detail, the present invention relates to an adaptive H.264 optimal coding mode estimation apparatus and method for performing fast video compression without damaging quality of restored video by adaptively minimizing the amount of calculations of a motion estimator and a mode decision unit having the greatest calculation load using global and local statistical information of an image in an H.264 video compression codec.

BACKGROUND ART

In multimedia, one of the requisite technical elements in multimedia applications is image compression technology for maximizing the use of available storage and transmission resources. Representative image compression techniques include MPEG-1/2/4, H.261/262/263, and H.264, wherein the latest standard, H.264, is a high-performance compression standard for providing compression efficiency of more than twice that of MPEG-2. Since H.264 can provide high quality video of a digital television level at a bit rate of less than 2 Mbps (mega bits per second), H.264 is used in various multimedia application fields, such as video streaming through a third generation wireless network, portable multimedia broadcasting such as Digital Multimedia Broadcasting (DMB), and Internet Protocol-Television (IP-TV) based on a current generation network such as Asymmetric Digital Subscribers' Loop (ADSL).

Basically, H.264 is a hybrid codec as in the conventional MPEG and H-series video compression standards and is based on motion estimation/compensation and transformation/quantization techniques. However, in H.264, motion compensation for much more various variable block sizes than in the conventional standards is selected, motion estimation from various reference images can be performed, the degree of freedom of an encoder is significantly increased by introducing new techniques unseen in the conventional standards, such as ¼-pixel basis motion compensation, pixel region intra estimation, integer transform in which the mismatch problem has been solved, and in-loop deblocking filter, to the H.264 standard, and thus if a 'well-designed encoder' is used, high compression performance can be provided. A 'well-designed encoder' is an encoder almost similar to an actual encoder for performing compression in terms of performance by searching various compression methods provided by the H.264 standard and their calculation results and selecting one method having the highest compression performance. However, this 'well-designed encoder' basically has very high calculation complexity proportional to the degree of freedom. Referring to an example of conventional encoders used in the H.264 video standard, it will now be described in more detail that the 'well-designed encoder' has very high calculation complexity.

An H.264 codec receiving every frame of video performs encoding in a frame by frame basis, decodes its result, stores the decoding result in a Decoded Picture Buffer (DPB), and uses the decoding result as a reference image for motion estimation when a subsequently input frame is encoded. Several decoded images can be stored in the DPB, and the maximum size of the decoded images depends on profile and level. Encoding of a current input image is achieved for each non-overlapping 16×16 basic unit called a macroblock. Actual encoding is achieved by performing motion estimation/restoration and mode decision for each macroblock and performing integer transformation and quantization of a difference between an original image and an image motion-restored at the optimal mode. Each encoded macroblock is dequantized and inverse transformed, and therefore a difference image is restored. Each decoded macroblock is generated by adding the difference image and a motion-restored image, and the decoded macroblocks are gathered. The gathered decoded macroblocks are loop-filtered in a slice by slice basis, and these results are stored in the DPB. By doing this, the total process of slice unit encoding ends. Unlike the conventional standards, a slice can be defined using various flexible structures in a single frame in H.264. However, in order to aid easy understanding of the configuration and operation of the present invention, a single slice is defined as the entire of a single frame input to an encoder in the following description.

FIG. 1 illustrates coding modes in H.264, wherein FIG. 1A illustrates inter macroblock available modes, FIG. 1B illustrates 16×16 intra macroblock available modes, and FIG. 1C illustrates 4×4 intra macroblock available modes. There are 21 macroblock coding modes defined in H.264. That is, the inter macroblock available modes illustrated in FIG. 1A include 5 motion compensation modes, i.e. SKIP, 16×16, 8×16, 16×8, and 8×8 motion compensation modes, wherein 3 sub-modes, i.e. 8×4, 4×8, and 4×4 sub-modes, exist for each 8×8 sub-block in the 8×8 motion compensation mode. When a macroblock is intra encoded, one of 4 16×16 intra prediction modes (FIG. 1B) or one of 9 4×4 intra prediction modes (FIG. 1C) is selected.

In order to encode a macroblock using one of the 21 illustrated available coding modes, an encoder must select a mode having the highest encoding efficiency by comparing encoding results obtained using the 21 coding modes to each other. For example, an H.264 standard encoder may obtain an optimal motion vector for each of the 7 inter macroblock available modes excluding the SKIP mode. The optimal motion vector among candidate motion vectors is obtained by minimizing Equation 1 below.

$$J_{motion} = SAD + \lambda_{motion} \cdot R_{motion} \quad \text{(Equation 1)}$$

Here, $\lambda_{motion}$ denotes a Lagrangian coefficient for motion estimation, and $R_{motion}$ denotes the number of bits needed to encode a candidate motion vector (mvx, mvy). SAD (Sum of Absolute Difference) denotes the sum of absolute values of differences between pixels of a motion-compensated macroblock generated using the candidate motion vector and pixels of a macroblock of an original image. If it is assumed that a candidate motion vector is (mvx, mvy), SAD is defined by Equation 2.

$$SAD = \sum_{x,y} |f_t(x, y) - \hat{f}_{t-n}(x - mvx, y - mvy)| \quad \text{(Equation 2)}$$

Here, $f_t(x,y)$ denotes a pixel located on an x row and a y column of a current input frame, and $\hat{f}_{t-n}(x,y)$ denotes a pixel located on an x row and a y column of an $n^{th}$ frame in a DPB.

Thus, in the 16×16 motion compensation mode, the SAD calculation for each candidate motion vector is performed through subtraction and absolute calculation of each of 16×16 pixels of a macroblock and addition calculation of the absolute values, and in the other motion compensation modes having a different block size, since these calculations are performed for pixels corresponding to each block size, the amount of SAD calculation becomes less. However, since blocks belonging to the same macroblock may have different optimal motion vectors, motion estimation must be performed for each block. Kinds of candidate motion vectors generally depend on the size of a search window, and if a search window having a 32×32 size is used, a total of 65×65 candidate motion vectors, i.e. (−32, −32), (−32, −31), (−32, −30), . . . , (−32, 32), (−31, −32), (−31, −31), . . . , (−31, 32), . . . , (32, 32), exist. That is, in order to find out an optimal motion vector in the 16×16 motion compensation mode, the SAD calculation for 16×16 pixels must be performed 65×65 times, and a candidate motion vector minimizing Equation 1 must be obtained from among the 65×65 candidate motion vectors. In order to find out an optimal motion vector in the 16×8 motion compensation mode, the SAD calculation for 16×8 pixels of each 16×8-block must be performed 65×65 times. If an encoder uses several reference images, the whole calculations for the optimal motion estimation must be repeatedly performed for the reference images, and a candidate motion vector minimizing Equation 1 must be obtained for each mode and each block. These optimal motion vectors obtained for the available modes are updated by performing an additional search of a few locations adjacent to each optimal motion vector, and this updating process is performed by calculating Equation 1 at the few locations, wherein pixel values at the few locations are obtained using a 6-tap Low Pass Filter (LPF) and a 2-tap LPF.

After estimating an optimal motion vector for each of the inter macroblock available modes from the calculation results, an optimal coding mode is decided through comparison with the intra macroblock available modes. The optimal coding mode is a coding mode minimizing Equation 3 for the 21 available modes illustrated in FIG. 1.

$$J_{mode} = SSD + \lambda_{mode} \cdot R_{mode} \quad \text{(Equation 3)}$$

Here, $\lambda_{mode}$ denotes a Lagrangian coefficient for mode decision, and $R_{mode}$ denotes the number of bits used to encode a macroblock in a current candidate mode. SSD (Sum of Squared Distortion) denotes a value obtained by adding squares of differences between pixels of a decoded macroblock and pixels of a corresponding macroblock of an original image. If it is assumed that $f_t(x,y)$ denotes a pixel located on an x row and a y column of an original image, and $\hat{f}_t(x,y)$ denotes a pixel located on an x row and a y column of a decoded image, SSD is defined by Equation 4.

$$SSD = \sum_{x,y} [f_t(x,y) - \hat{f}_t(x,y)]^2 \quad \text{(Equation 4)}$$

Thus, mode decision is performed by obtaining $R_{mode}$ that is the number of encoding bits by encoding a current macroblock to be encoded using the 21 available modes illustrated in FIG. 1, obtaining SSD of Equation 4 by decoding the encoded macroblock, and comparing cost functions of Equation 3. Herein, when encoding and decoding are performed in the inter macroblock available modes, an optimal motion vector of each mode obtained from motion estimation is used, wherein in the SKIP mode, motion vectors to be used are calculated from already encoded adjacent macroblocks.

The above-described motion estimation and mode decision method in an encoder according to the H.264 video standard requires a large amount of calculation and is the most complex component in the encoder, accounting for 60~70% of the entire encoder complexity. Thus, for development of a "well-designed fast encoder", high speed of the most complex component of the encoder and minimization of image quality due to high speed must be considered.

Representative conventional schemes for quickly performing this complex H.264 mode decision process will now be described. The common basic idea of these schemes is to decrease the complexity of an encoder by combining a motion estimator and a mode decision unit in order not to perform calculation for the motion estimation or mode decision in specific modes predicted that will not often occur among the available modes. According to C. Sampath Kannangara, Iain E. G. Richardson, Maja Bystrom, Jose R. Solera, Yafan Zhao, Andrew MacLennan, and Robert Cooney ("Low-complexity skip prediction for H.264 through Lagrangian cost estimation", IEEE Trans. Circuits and Syst. for Video Technol., vol. 16, no. 2, pp. 202-208, February 2006), the SKIP mode is examined first of all in a first phase of coding mode decision, and if it is determined that the result shows that encoding possibility in the SKIP mode is high, high speed is achieved by excluding all mode decision related calculations performed and encoding a current object to be encoded in the SKIP mode. That is, it is determined by first obtaining a cost function represented by Equation 3 when a current macroblock to be encoded is encoded in the SKIP mode and comparing the cost function to a specific threshold whether calculations related to motion estimation and mode decision for the other available modes are performed. However, since this method considers only the SKIP mode while sequential calculations are performed as usual for the other coding modes, an increase of performance for high speed of an encoder is limited.

In order to overcome this limitation, a method of determining by deciding priority of all coding modes including the SKIP mode, sequentially calculating the cost function represented by Equation 3 according to the decided priority, and comparing the results to a series of adaptive thresholds whether calculations for the other modes are performed has been used.

The conventional techniques pursuing fast mode decision for all coding modes including the SKIP mode can be largely divided into two categories. The first category includes methods of reducing a total of calculations by performing a specific calculation to decide candidate modes suitable for a current macroblock and performing the comparison of the cost function represented by Equation 3 for only the decided candidate modes, and Qionghai Dai, Dongdong Zhu, and Rong Ding ("Fast mode decision for inter prediction in H.264", in Proc. IEEE ICIP, October 2004, vol. 1 pp. 119-122); Hyungjoon Kim and Yucel Altunbasak ("Low-complexity macroblock mode selection for H.264/AVC encoders", in Proc. IEEE ICIP, October 2004, vol. 2, pp. 765-768); Andy C. Yu and Graham R. Martin ("Advanced block size selection algorithm for inter frame coding in H.264/MPEG-4 AVC", in Proc. IEEE ICIP, October 2004, vol. 1, pp. 95-98) correspond to the first category.

In the case of Qionghai Dai et. al, high speed of an encoder is pursued by performing the motion estimation and mode decision calculations for an image having ¼ resolution of an original image to be encoded, selecting specific candidate modes based on an optimal mode result obtained in the low-resolution image, performing mode decision in the original image having full resolution for only the selected modes. A candidate mode selection table used in this method is illustrated in Table 1.

TABLE 1

Mode obtained in a low-resolution image

| Macroblock mode | Inter mode smaller than 8 × 8 | Candidate modes |
|---|---|---|
| SKIP | | SKIP, P16 × 16 |
| I16 × 16 | | I16 × 16 |
| I4 × 4 | | I16 × 16, I4 × 4 |
| P8 × 8 | SKIP | SKIP, P16 × 16 |
| | P8 × 8 | P16 × 16, P8 × 8 |
| | P8 × 4 | P16 × 8, P8 × 4 |
| | P4 × 8 | P8 × 16, P4 × 8 |
| | P4 × 4 | P8 × 8, P4 × 8, |
| | | P8 × 4, P4 × 4 |

In more detail, by applying a 7-tap LPF to an original resolution image in the horizontal and vertical directions, a ¼-resolution image down-sampled by ½-resolution in each of the horizontal and vertical directions is obtained. For each macroblock of the obtained low-resolution image, the motion estimation and mode decision calculations of an illustrated encoder provided in the H.264 standard are performed for all of the intra macroblock available modes and the inter macroblock available modes having less than the 8×8 size. While the mode decision calculation is performed, the motion estimation and mode decision of an original resolution macroblock are performed by selecting two modes having the least encoding cost function value represented by Equation 3 and selecting candidate modes illustrated in Table 1. In Table 1, I denotes an intra mode, and P denotes an inter mode. That is, P16×16 denotes a 16×16-sized inter mode, and I4×4 denotes a 4×4-sized intra mode. This method is a technique for decreasing the calculation complexity of a well-designed encoder by effectively limiting candidate modes having a high possibility of being used for the encoding. However, since only the inter macroblock available modes having less than the 8×8 size can be searched due to pre-processing of a low-resolution image, there are many candidate modes to be searched to decide an actual coding mode in original resolution as illustrated in Table 1, and thus, the increase of performance is limited.

On the other hand, in the case of Hyungjoon Kim et. al, a total amount of calculation is decreased by performing a fast mode search in original resolution based on Sum of Absolute Transformed Difference (SATD) for all candidate modes and performing an actual mode decision calculation for only a few optimal candidate modes selected according to the search result. In more detail, in this method, optimal motion vectors making Equation 1 minimized in the inter macroblock available modes are obtained, and an encoding cost function represented by Equation 5 is calculated for each of all available modes of inter macroblocks and intra macroblocks illustrated in FIG. 1.

$$J_{SATD} = SATD + \lambda_{mode} \cdot R_{est} \quad \text{(Equation 5)}$$

Here, SATD denotes a value obtained by performing Hadamard transform of a difference between a motion-estimated or intra-predicted macroblock and an original macroblock to be encoded and summing absolute values of transform coefficients, and $R_{est}$ denotes the number of bits used to encode a macroblock header and a motion vector. A coding mode of a current macroblock is decided by selecting N candidate modes minimizing Equation 5 from among the 21 available modes and performing actual mode decision represented by Equation 3 for the N candidate modes. Since SATD can be performed using only a series of simple integer calculations and $R_{est}$ can be easily implemented in a table referring method, the method disclosed by Hyungjoon Kim et. al can perform fast mode decision without damaging image quality when compared to the full mode decision method represented by Equation 3. However, in this technique, there are problems that the number (N) of optimal candidate modes cannot be adaptively changed according to a video characteristic and a high calculation load of a motion estimator associated with the mode decision cannot be collectively minimized.

In the case of Andy C. Yu et. al, candidate modes to be searched are limited by measuring complexity or activity of a current unit to be encoded and motion consistency of encoding unit sub-blocks and comparing the measured result to an experimental threshold. In more detail, a complexity ratio $R_c$ represented by Equation 6 is obtained for a current macroblock to be encoded.

$$R_c = \frac{\ln(E_{AC})}{\ln(E_{max})} \quad \text{(Equation 6)}$$

Here, $E_{AC}$ denotes total energy of high frequency (AC coefficient) coefficients of the current macroblock, and $E_{max}$ denotes the maximum variance of the current macroblock.

The obtained complexity ratio $R_c$ is compared to the experimental threshold, and if $R_c$ is less than the experimental threshold, the current macroblock is classified to a homogeneous area, otherwise a heterogeneous area. If the current macroblock corresponds to the homogeneous area and a macroblock of a previous frame, which exists at the same position of the current macroblock, is encoded with not less than 8×8 size, the mode decision represented by Equation 3 is performed by limiting candidate modes of the current macroblock to SKIP, P16×16, and all the available intra modes, otherwise, 4 motion vectors minimizing Equation 1 are estimated for 8×8-sized blocks belonging to the current macroblock. A continuous motion macroblock or discontinuous motion macroblock is distinguished by obtaining the maximum absolute value of differences between the 4 estimated optimal motion vectors and comparing the maximum absolute value to the threshold. If the current macroblock is distinguished as a continuous motion macroblock, mode decision satisfying Equation 3 is performed for SKIP, P16×16, P16×8, P8×16, and all the available intra macroblock modes, otherwise a coding mode of the macroblock to be encoded is set by performing mode decision satisfying Equation 3 for all the 21 available modes. This method is a technique for decreasing the complexity of an encoder by properly limiting candidate modes for the mode decision to be performed through Equation 3 using the complexity and motion consistency of a current macroblock to be encoded. However, information regarding adjacent macroblocks or already encoded previous macroblocks is not used by reflecting only the characteristic of a macroblock to be encoded, the intra macroblock available modes cannot be limited, and candidate modes are basically selected by only distinguishing inter macroblock available modes having a large sub-block size from inter macroblock available modes having a small sub-block size, and thus an improvement effect on performance is limited.

Although the conventional techniques for fast H.264 coding mode decision described above implement high speed for all H.264 coding modes including the SKIP mode, these techniques perform the mode calculation in the determined sequence regardless of an image characteristic or coding characteristic, and consequently an optimal mode is obtained by calculating a large number of modes (on the contrary, the present invention that will be described later has the fundamental difference from these conventional techniques in that a relatively high complexity improvement effect can be obtained by deciding candidate modes through a statistical characteristic based on an encoding history).

Meanwhile, the second category of the conventional techniques performing fast mode decision for all coding modes including the SKIP mode includes methods of reducing a total of calculations by removing cases, which do not often occur as an optimal mode, from candidate modes using a global statistical characteristic of the optimal mode as disclosed by Lidong Xu and Xinggang Lin ("Fast mode decision for inter frames in H.264/AVC", in Proc. IEEE ISCIT, October 2005, vol. 1, pp. 433-436); Dongming Zhang, Yanfei Shen, Shouxun Lin, and Yongdong Zhang ("Fast inter frame encoding based on modes pre-decision in H.264", in Proc. IEEE International Conf. on Multimedia and Expo, ICME, July 2005, pp. 530-533). First, Lidong Xu et. al analyzed an occurrence frequency change of each mode including various-sized segmented spaces using a statistical characteristic of results obtained through calculation for deciding all modes in H.264. A search sequence of each mode was determined through the analysis result, and by comparing a value of a result cost function according to mode selection with a determined threshold while the calculation for mode decision is performed in the determined sequence, it is determined whether the mode decision ends early or a search of a specific mode is not performed. This method will now be described in more detail.

The cost function $J_{mod\ e}$ of Equation 3 is obtained for the SKIP mode having the least amount of calculation of motion estimation and is called $J_{mod\ e}(SKIP)$. The obtained $J_{mod\ e}(SKIP)$ is compared to a threshold $T_1$, and if $J_{mod\ e}(SKIP)<T_1$, the SKIP mode is decided as an optimal mode of a current macroblock, and all subsequent mode decision calculations are avoided. If $J_{mod\ e}(SKIP) \geq T_1$, $J_{mod\ e}(SKIP)$ is compared to a second threshold $T_2$, and if $J_{mod\ e}(SKIP)<T_2$, a mode search for the intra macroblock available modes is not performed. If the current macroblock to be encoded is not decided as the SKIP mode in the first process described above, an optimal motion vector of Equation 1 is estimated for the P16×16 mode, and a cost function of Equation 3 is calculated using the estimated motion vector and is called $J_{mod\ e}(P16\times16)$. By introducing a third threshold $T_3$, if $J_{mod\ e}(SKIP)<T_2$ and $J_{mod\ e}(SKIP)<J_{mod\ e}(P16\times16)+T_3$, a mode having a smaller value from among $J_{mod\ e}(P16\times16)$ and $J_{mod\ e}(SKIP)$ is decided as an optimal mode for encoding the current macroblock, and all subsequent mode decision calculations are stopped. This decision has an improvement effect due to selection of the P16×16 mode as compared to the SKIP mode; however, cases having a no large value are selected, and this is because the possibility is high that even if a mode having smaller segmented spaces is adopted, an improvement effect in terms of cost function is not high.

If the SKIP mode or the P16×16 mode is not decided since the above conditions are not satisfied, an optimal motion vector of Equation 1 is estimated for each of the P16×8 and P8×16 modes having a next smaller segmented space, cost functions of Equation 3 using the estimated results are obtained, and a smaller value of the cost functions is called $J_{mod\ e}(P16)$. If the obtained value of $J_{mod\ e}(P16)$ is greater than $J_{mod\ e}(SKIP)$ or $J_{mod\ e}(P16\times16)$, this means that a cost function increases as a mode includes a smaller segmented space, and thus a mode having a smaller value from among $J_{mod\ e}(P16\times16)$ and $J_{mod\ e}(SKIP)$ is decided as an optimal mode for encoding the current macroblock, and all subsequent mode decision calculations are stopped. In a case that does not correspond to any of the cases described above, motion vector estimation satisfying Equation 1 is performed for the P8×8 mode and all other inter macroblock available modes having a smaller segmented space than the P8×8 mode, and a cost function of Equation 3 is calculated using the motion vector estimation result. This result is compared to cost functions of Equation 3 using all intra macroblock available modes, and an optimal mode is decided by performing an all-mode search as well as before. Here, one attention point is that whether the intra macroblock available modes are used is determined according to the result of comparison between $J_{mod\ e}(SKIP)$ and $T_2$ in the early stage of this method.

Although this method significantly improved the complexity of H.264 encoding by effectively using the statistical characteristic of a coding mode that most background portions existing on video screens are encoded in a mode including a large segmented space, since a characteristic of temporally varying video screens is not adaptively used (this means that a coding mode search sequence for all macroblocks is fixed by a general statistical characteristic), a change per scene according to a degree of high speed is very high, and since a fixed threshold without adaptability is used regardless of a significant change of the degree of high speed and decoded image quality according to the set threshold, video to be processed and a gain according to an encoding environment are not uniform.

Meanwhile, Dongming Zhang et. al performed statistical optimal mode occurrence frequency analysis similar to Lidong Xu et. al for a case of using a plurality of reference images and considerably limited candidate modes to be used in second and further reference images using the analysis result. This method will now be described in more detail.

By calculating a cost function of Equation 1 for the SKIP mode and comparing the cost function to a threshold, it is determined whether mode decision calculation is stopped. If the SKIP mode is not decided, an optimal mode minimizing a cost function represented by Equation 3 is decided for all available modes using a first reference image as in an illustration of an H.264 encoder, and the following intermediate variables are set:

BetterIntraMode—mode having a cost function value of Equation 3 from among I16×16 and I4×4;

BestMode—mode having the minimum cost function of Equation 3 from among all available modes; and CostBestMo—a cost function value of Equation 3 in BestMode.

Using the set intermediate variables, candidate modes for performing a mode decision search in a subsequent reference image are set as described below. This candidate mode setting method reflects a statistical characteristic of an optimal coding mode.

When BestMode is P16×8, P16×8 and P8×8 are set as candidate modes, and if BetterModeIntra is I4×4, all available modes including a segmented space smaller than 8×8 are added to the candidate modes.

When BestMode is P8×16, P8×16 and P8×8 are set as candidate modes, and if BetterModeIntra is I4×4, all available modes including a segmented space smaller than 8×8 are added to the candidate modes.

In the other cases, P8×8 is set as a candidate mode, and if BetterModeIntra is I16×16, P16×16 is added as a candidate mode.

An optimal coding mode is selected by calculating motion estimation represented by Equation 1 and encoding cost function represented by Equation 3 for the set candidate modes, the selected optimal coding mode is called BestModeNew, and its cost function value is called CostBestModeNew. If BestModeNew>BestMode, a current macroblock is encoded in BestMode, and no further reference image search is performed. If BestModeNew≦BestMode, BestMode and CostBestMode are updated to BestModeNew and CostBestModeNew, and candidate mode setting and optimal coding mode search for a subsequent reference image are performed. By recursively repeating the above-described process, fast coding mode decision for all reference images is performed.

Although this method could significantly improved the calculation complexity of an H.264 encoder for mode decision through statistical optimal mode occurrence frequency analysis in an encoding environment using a plurality of reference images, as in the case of Lidong Xu et. al, since a candidate mode decision method is fixed by generalizing statistical characteristics existing in several video screens, a characteristic of temporally varying video screens cannot be not adaptively used.

DETAILED DESCRIPTION OF THE INVENTION

Technical Problem

In order to solve the above-described problems, the present invention adaptively reconfigures a search sequence of coding modes by classifying and using statistical characteristics of an optimal coding mode according to temporal and spatial positions of a current encoding unit. In addition, while most conventional fast H.264 coding mode techniques described above set thresholds based on an intuitive criterion and limit candidate modes using the thresholds, the present invention actively adapts to a statistical characteristic change in terms of encoding of video data to be encoded by using an adaptive threshold based on an encoding error (cost function) experienced in already encoded adjacent encoding units.

Thus, the purpose of the present invention is to simplify and increase the speed of a complex mode decision process without significantly degrading image quality or reducing a compression ratio by correctly estimating a coding mode of each macroblock with the minimum cost and calculating Rampage Data Objects (RDO) first for the estimated mode. In order to do this, the present invention provides correct compression mode estimation in coding of an image in a similar environment after recording a characteristic of each image and a coding characteristic by introducing a multiple estimation table method for divergence estimation of a processor. Unlike conventional methods, the present invention can more accurately estimate a compression mode by dynamically applying and managing various characteristics of image data.

Technical Solution

According to an aspect of the present invention, there is provided an H.264 mode estimation apparatus comprising a macroblock mode estimator which comprises tables for efficiently storing and estimating an image characteristic of a macroblock being coded and spatial/temporal mode histories and a table management unit for systematically updating and managing these histories.

Advantageous Effects

As described above, according to the present invention, by estimating a coding optimal mode of a current block by recording a pattern of a mode decision result of a previous macroblock instead of a complex H.264 RDO calculation mode, a compression coding time is dramatically reduced with only RD-cost calculation of a small number of modes without significant image quality loss. In addition, in the case of real-time hardware codec design, the number of calculated modes needs to be limited in order to satisfy a timing limitation, and in this case, the present invention can provide maximum compression efficiency and high image quality within a given time by sequentially providing modes from a mode having a higher possibility.

DESCRIPTION OF THE DRAWINGS

The above and other features and advantages of the present invention will become more apparent by describing in detail exemplary embodiments thereof with reference to the attached drawings in which.

MODE OF THE INVENTION

Hereinafter, exemplary embodiments of an H.264 mode estimation apparatus and method according to the present invention will be described in detail with reference to the attached drawings. The embodiments set forth herein are for describing concrete execution patterns to implement the technical spirit of the H.264 mode estimation apparatus and method according to the present invention and do not limit the is technical scope of the present invention.

Figure 1:
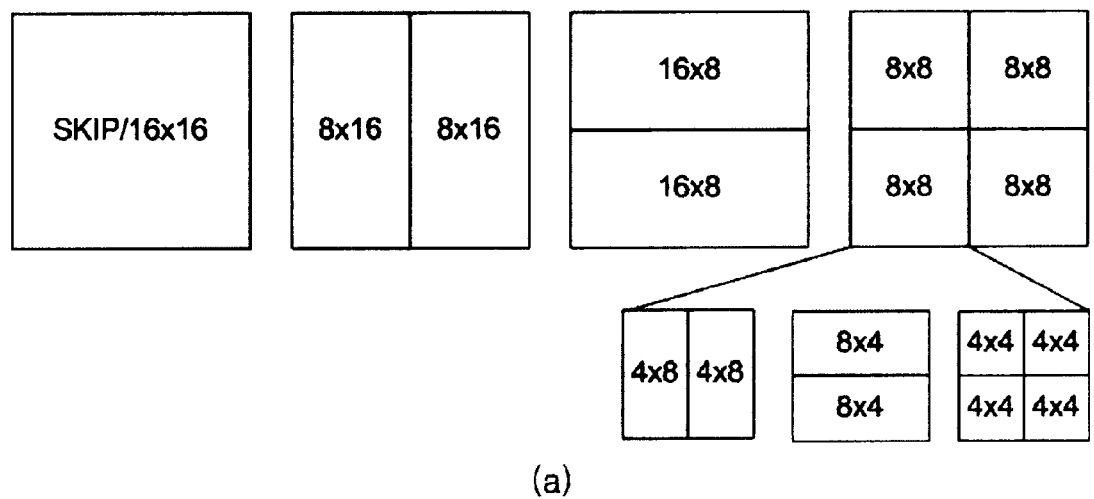
FIG. 1 illustrates general H.264 coding modes.
Figure 1:
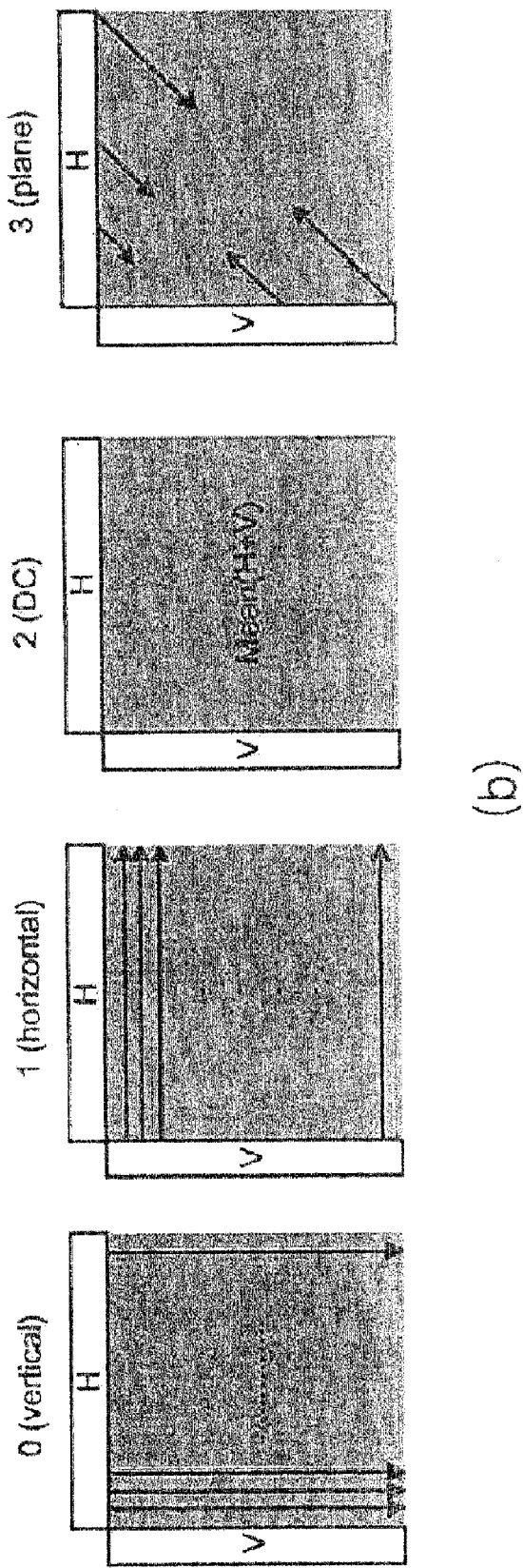
Figure 1:
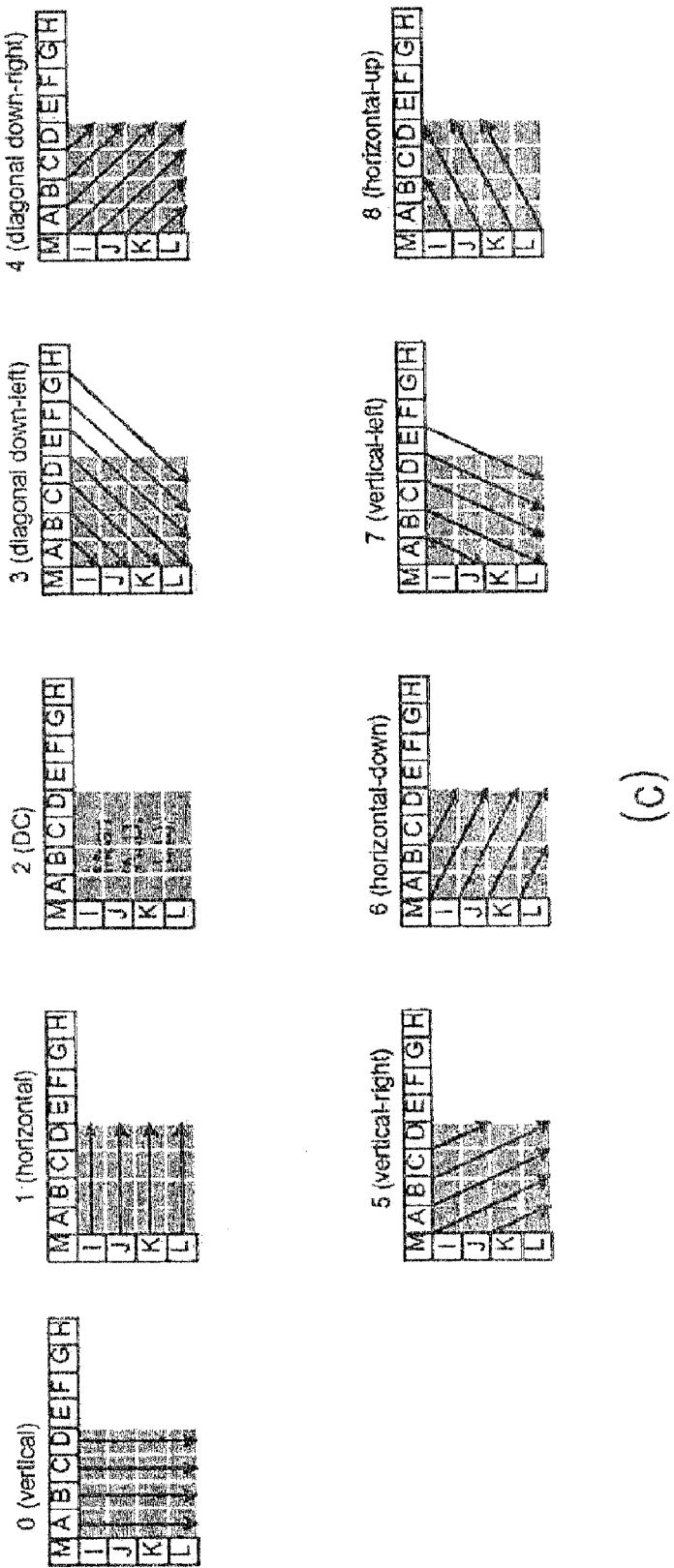
Figure 2:
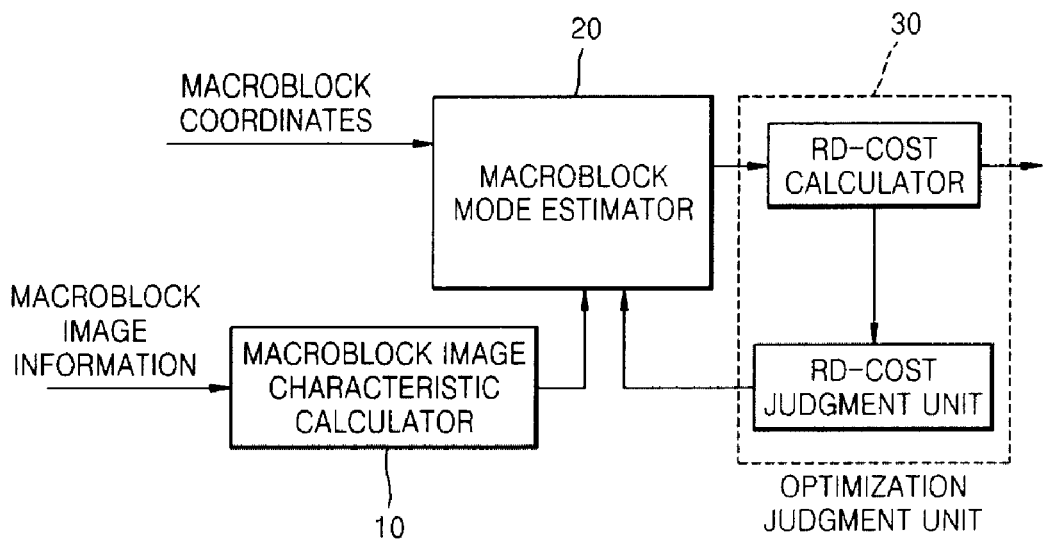
FIG. 2 is a schematic block diagram of an apparatus for estimating an H.264 compression mode, according to an embodiment of the present invention.

FIG. 2 is a schematic block diagram of an apparatus for estimating an H.264 compression mode according to an embodiment of the present invention. Referring to FIG. 2, the H.264 mode estimation apparatus according to the current embodiment of the present invention includes a macroblock image characteristic calculator 10 calculating a macroblock image characteristic from macroblock image information, a macroblock mode estimator 20, which includes mode history tables and a table management unit managing these tables, in order to estimate a mode of a current macroblock from macroblock coordinates, and a mode estimation optimization judgment unit 30 calculating Rate Distortion (RD)-cost for mode estimation and selecting an optimal mode in order to prevent the spread of errors of the estimated mode. In the current embodiment of the present invention, the technical spirit of the present invention is implemented by the macroblock mode estimator 20, and the other components, i.e. the macroblock image characteristic calculator 10 and the mode estimation optimization judgment unit 30, are added to enhance the performance of the macroblock mode estimator 20.

Figure 3:
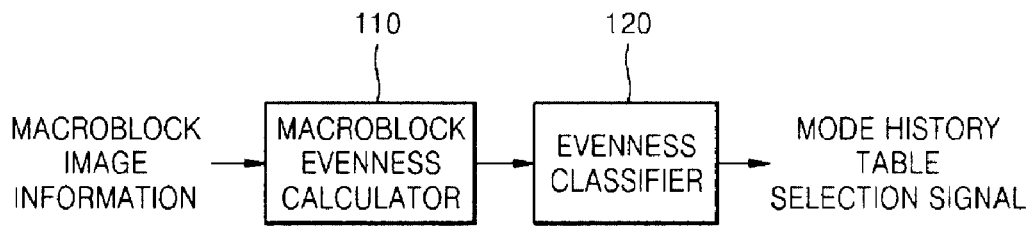
FIG. 3 is a block diagram of a macroblock image characteristic calculator illustrated in FIG. 2, according to an embodiment of the present invention.

FIG. 3 is a block diagram of the macroblock image characteristic calculator 10 illustrated in FIG. 2, according to an embodiment of the present invention. Referring to FIG. 3, the macroblock image characteristic calculator 10 according to the current embodiment of the present invention includes a macroblock evenness calculator 110 and an evenness classifier 120. The macroblock evenness calculator 110 obtains variance of pixel values in a 16×16-macroblock in order to calculate the evenness of the macroblock from input macroblock image information. In this case, in order to reduce the complexity of 16×16-macroblock variance calculation, block evenness is obtained using a variance value of pixels in an edge of the macroblock instead of pixels of the entire macroblock. This can reduce the amount of calculation by ¼ and measure a high frequency component of image contents passing through the edge. The evenness classifier 120 divides the calculated evenness of a macroblock by n, and this 1/n-classified evenness is output as a history table selection signal, determining a number of a mode history table for estimating an H.264 mode.

Figure 4:
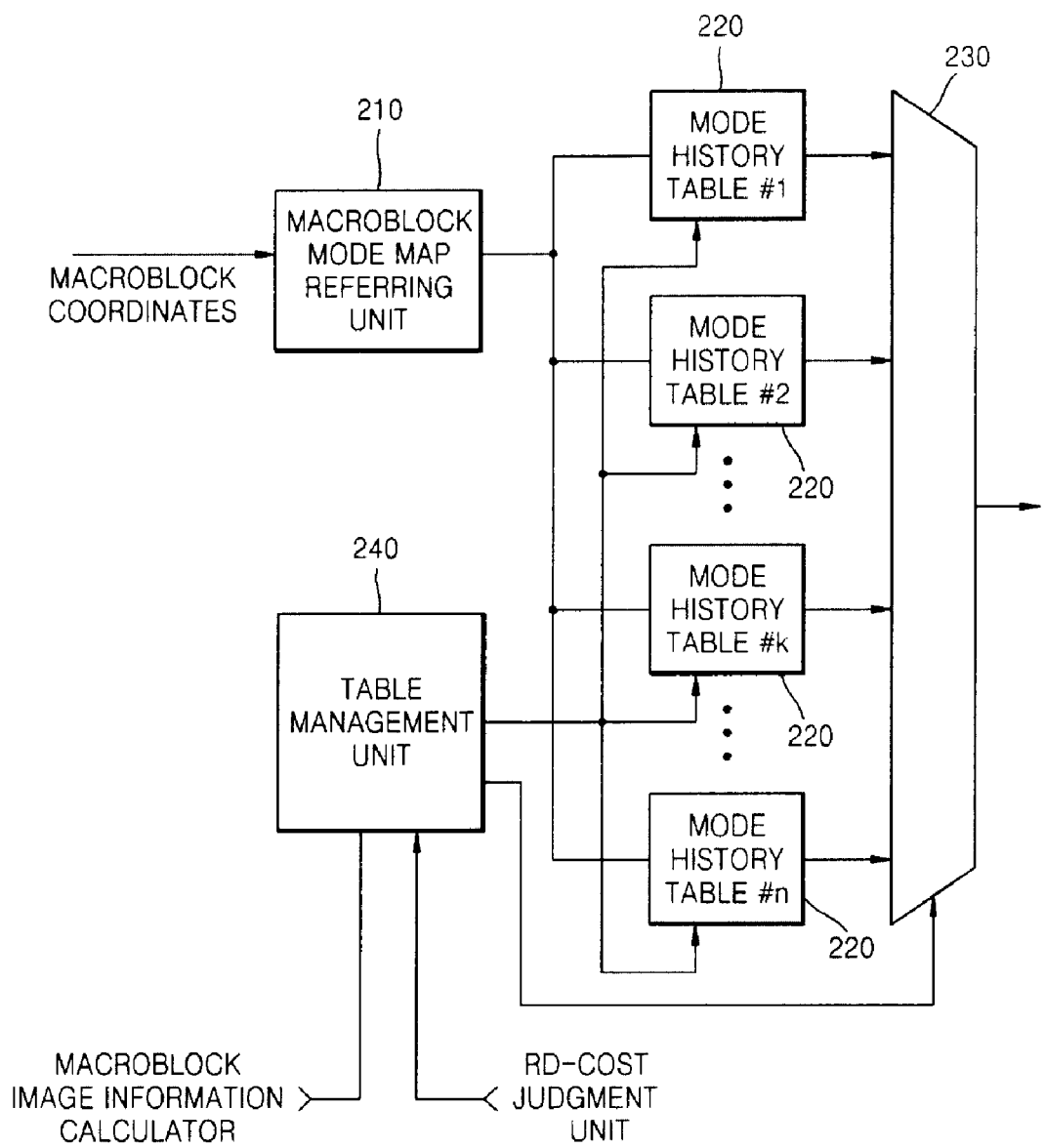
FIG. 4 is a block diagram of a macroblock mode estimator illustrated in FIG. 2, according to an embodiment of the present invention.

FIG. 4 is a block diagram of the macroblock mode estimator 20 illustrated in FIG. 2, according to an embodiment of the present invention. Referring to FIG. 4, the macroblock mode estimator 20 according to the current embodiment of the present invention includes a macroblock mode map referring unit 210, n mode history tables 220, a multiplexer 230, and a table management unit 240. The n mode history tables 220 correspond to an image evenness level of a macroblock, which is calculated and classified by the macroblock image characteristic calculator 10. Each of the n mode history table 220 has a number between 1 and n, and a $k^{th}$ mode history table stores a mode history of a macroblock having a $k^{th}$ level of evenness and estimates a coding mode of a block having a $k^{th}$ level of evenness in the future. That is, if an image evenness level of a macroblock being coded is $1 \leq k \leq n$, a coding mode of the macroblock is estimated using the $k^{th}$ mode estimation table.

Figure 5:
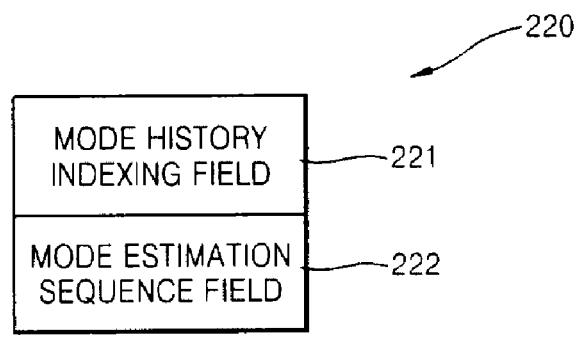
FIG. 5 is a configuration of a mode history table illustrated in FIG. 4, according to an embodiment of the present invention.

FIG. 5 is a configuration of one of the n mode history tables 220 illustrated in FIG. 4, according to an embodiment of the present invention. Referring to FIG. 5, each of the n mode history table 220 includes a mode history indexing field 221 and a mode estimation sequence field 222 corresponding to each mode history indexing field 221. The mode history indexing field 221 is composed of a set of a modes, and the mode estimation sequence field 222 includes b history modes and a field storing the number of selections of each history mode. Thus, an estimation table size is determined by how many modes are used for indexing and how many estimation modes are recorded in each mode estimation sequence field 222.

Figure 6:
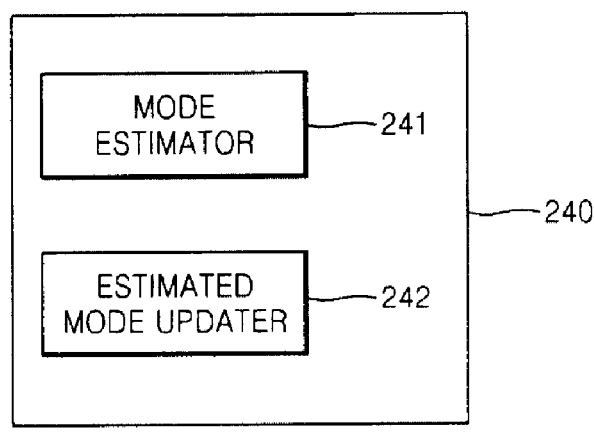
FIG. 6 is a block diagram of a table management unit illustrated in FIG. 4, according to an embodiment of the present invention.

Referring back to FIG. 4, the table management unit 240 receives a mode history table selection signal from the macroblock image characteristic calculator 10 and is connected to the multiplexer 230 to select one of the n mode history tables 220, and receives a judgment result signal from the mode estimation optimization judgment unit 30 and performs final mode estimation. FIG. 6 is a block diagram of the table management unit 240 illustrated in FIG. 4, according to an embodiment of the present invention. Referring to FIG. 6, the table management unit 240 includes a mode estimator 241 and an estimated mode updater 242.

Figure 7:
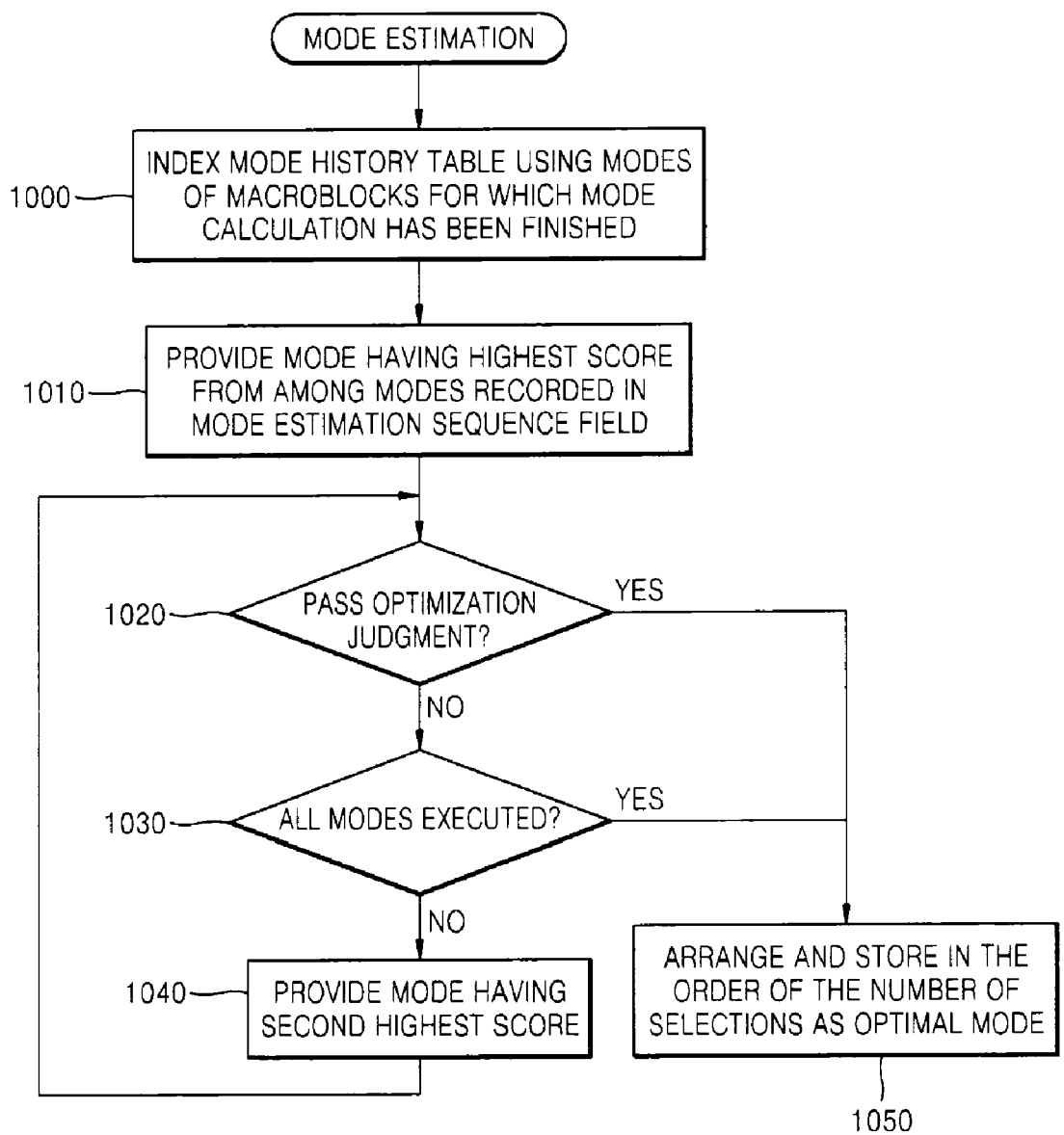
FIG. 7 is a flowchart of an operation of a mode estimator illustrated in FIG. 6, according to an embodiment of the present invention.

The mode estimator 241 estimates modes of a current macroblock being coded and calculates an H.264 RD-cost from a mode having the highest possibility. An operation of the mode estimator 241 will now be described with reference to FIG. 7. FIG. 7 is a flowchart of an operation of the mode estimator 241 illustrated in FIG. 6, according to an embodiment of the present invention. Referring to FIG. 7, in step 1000, a mode history table is indexed using modes of macroblocks adjacent to a current macroblock and for which mode calculation has been performed. A mode having the highest score (i.e., the most frequently selected mode) from among modes recorded in a mode estimation sequence field of the mode history table is provided in operation 1010. It is determined in operation 1020 whether an RD-cost of this mode passes an optimization judgment code, and if it is determined in operation 1020 that the RD-cost does not pass the optimization judgment code, a mode having the second highest score is provided in operation 1040. These procedures repeatedly proceed until the provided mode passes the optimization judgment code or until all modes recorded in the mode estimation sequence field are checked in operation 1030. If the RD-cost passes the optimization judgment code in operation 1020 or if all modes are checked in operation 1030, estimated modes of each field are arranged and stored in the order of the number of selections as an RD-cost optimal mode in operation 1050. This is performed to more easily manage and select a mode in an estimation process and a table field updating process.

Figure 8:
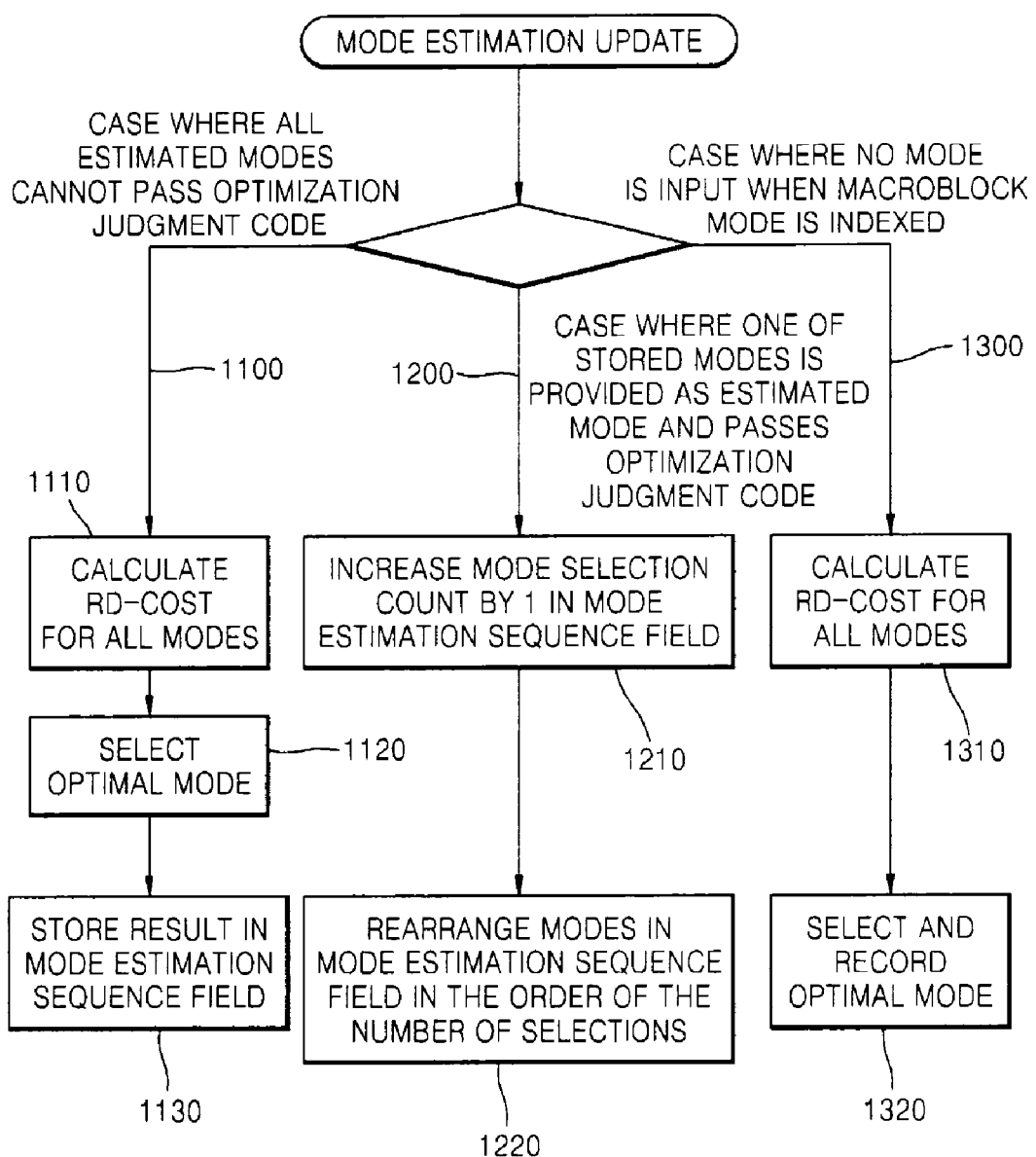
FIG. 8 is a flowchart of an operation of an estimated mode updater illustrated in FIG. 6, according to an embodiment of the present invention.

FIG. 8 is a flowchart of an operation of the estimated mode updater 242 of the table management unit 240, according to an embodiment of the present invention All estimated mode updating operations of a mode history table are performed in three cases.

In the case of the first mode updating operation, if all estimated modes cannot pass the RD-cost optimization judgment code in the estimation process described above in operation 1100, an RD-cost is calculated for all modes in operation 1110, an optimal mode is selected in operation 1120, and the result is stored in a mode estimation sequence field in operation 1130. When the optimal mode selection result is stored, the following method can be applied. That is, if the number of stored modes is less than b (i.e., the maximum number of stored modes), a new mode is added to the mode estimation sequence field, and its mode selection count is set to 1. If the number of stored modes is equal to b, the least selected mode among the stored modes is removed, and a new mode is stored instead. In this case its mode selection count is set to 1.

In the case of the second mode updating operation, one of a plurality of stored modes is provided as an estimated mode and passes the RD-cost optimization judgment code in operation 1200. In this case, since the mode that has passed the RD-cost optimization judgment code is already stored in the mode estimation sequence field, its mode selection count is increased by 1 in operation 1210, and modes in the mode estimation sequence field is rearranged in the order of the number of selections in operation 1220.

In the case of the third mode updating operation, no mode is input in operation 1300 when a table is indexed using modes of blocks adjacent to a current macroblock. This case occurs when any macroblock having this kind of adjacent mode set has not been coded even once. In this case, an RD-cost of all modes must be calculated in operation 1310, and an optimal mode must be selected and recorded in operation 1320. This is performed to more accurately obtain first data that is the beginning of history recording for estimation.

For much better codec performance, the RD-cost calculation of all modes can be repeated until k modes are stored in an estimation table field.

Referring back to FIG. 2, the H.264 mode estimation apparatus according to an embodiment of the present invention includes not only the macroblock image characteristic calculator 10 and the macroblock mode estimator 20 that have been described above but also the mode estimation optimization judgment unit 30. The possibility of the use of a wrong mode and of inducing an error to mode decision of a subsequent macroblock due to the wrong mode decision is maximally reduced by checking whether an RD-cost of an estimated mode of a current macroblock being coded is close to an optimal value using the mode estimation optimization judgment unit 30.

Figure 9:
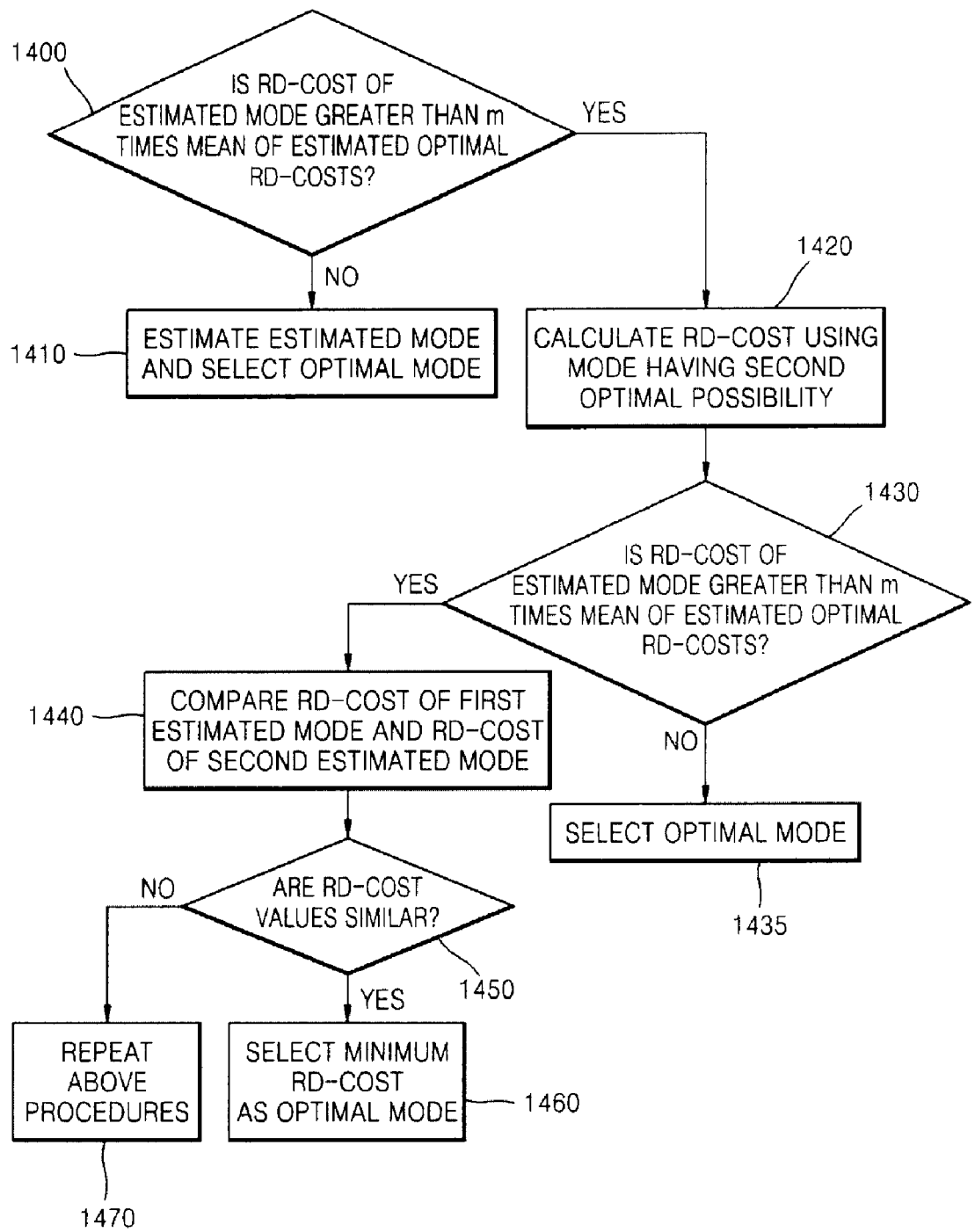
FIG. 9 is a flowchart of an operation of a mode estimation optimization judgment unit 30, according to an embodiment of the present invention.

FIG. 9 is a flowchart of an operation of the mode estimation optimization judgment unit 30, according to an embodiment of the present invention. Referring to FIG. 9, the mode estimation optimization judgment unit 30 determines in operation 1400 whether an RD-cost of an estimated mode of a current macroblock is greater than m times a mean value of optimal (or estimated optimal) RD-costs of adjacent macroblocks, and if the RD-cost of the estimated mode of the current macroblock is less than or equal to m times the mean value, the estimated mode is selected as an estimated optimal mode in operation 1410, and if the RD-cost of the estimated mode of the current macroblock is greater than m times the mean value, an RD-cost is calculated using a mode having the second optimal possibility in operation 1420, and the estimated mode RD-cost optimization judgment unit 30 determines whether an RD-cost of an estimated mode of a current macroblock is greater than m times a mean value of optimal (or estimated optimal) RD-costs of adjacent macroblocks in operation 1430 again. If the latter mode satisfies the condition, the latter mode is selected as an estimated optimal mode, and this mode decision calculation ends in operation 1435. If the latter mode does not satisfy the condition, the RD-cost of the latter mode is compared to the RD-cost of the first estimated mode in operation 1440. This is to consider a case where the current macroblock is significantly different from adjacent RD-costs, and if the RD-cost of the first estimated mode is similar to the RD-cost of the second estimated 20 mode (i.e., first RD-cost<(hx second RD-cost) or first RD-cost>(hx second RD-cost)) in operation 1450, the mode decision calculation ends. However, if the the RD-cost of the first estimated mode is not similar to the RD-cost of the second estimated mode, RD-costs of third and fourth estimated modes are checked using the same method in operation 1470. If the RD-cost of the current mode is similar to the minimum value of the calculated RD-costs of estimated modes (i.e., current mode RD-cost<(hx previous estimated mode minimum RD-cost) or current mode RD-cost>(hx previous estimated mode minimum RD-cost)), the minimum RD-cost mode of them is selected as an optimal mode, the mode decision calculation ends in operation 1460. If the judgment condition is not satisfied even after all modes recorded in the estimation field of the mode estimation table are checked, an optimal mode is obtained by obtaining RD-costs of all modes, and the table is updated for mode estimation of a subsequent macroblock.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. An apparatus for estimating an H.264 compression mode, the apparatus comprising:
a macroblock mode estimator which comprises mode history tables and a table management unit managing these tables, in order to estimate a mode of a current macroblock from input macroblock coordinates,
wherein the macroblock mode estimator comprises:
the mode history tables, each comprising a mode history indexing field and a mode estimation sequence field corresponding to each indexing field; and
the table management unit comprising a mode estimator estimating a mode using the mode history tables and an estimated mode updater updating a mode stored in a table to the estimated mode;
a macroblock image characteristic calculator calculating a macroblock image characteristic from macroblock image information,
wherein the macroblock image characteristic calculator comprises:
a macroblock evenness calculator obtaining variance of pixel values in a macroblock in order to calculate the evenness of the macroblock from input macroblock image information; and
an evenness classifier determining a number of a mode history table by dividing the calculated macroblock evenness by n and outputting this 1/n-classified evenness as a mode history table selection signal, wherein n is an integer equal to or greater than 1.

2. The apparatus of claim 1, wherein the mode history tables are respectively set for n levels classified by the evenness classifier.

3. An apparatus for estimating an H.264 compression mode, the apparatus comprising:
a macroblock mode estimator which comprises mode history tables and a table management unit managing these tables, in order to estimate a mode of a current macroblock from input macroblock coordinates,
wherein the macroblock mode estimator comprises:
the mode history tables, each comprising a mode history indexing field and a mode estimation sequence field corresponding to each indexing field; and
the table management unit comprising a mode estimator estimating a mode using the mode history tables and an estimated mode updater updating a mode stored in a table to the estimated mode;
a mode estimation optimization judgment unit calculating Rate Distortion (RD)-cost for the mode estimated by the macroblock mode estimator and selecting an optimal mode in order to prevent the spread of errors of the estimated mode,
wherein the mode estimation optimization judgment unit comprises:
a member determining whether an RD-cost of an estimated mode of a current macroblock is greater than m times a mean value of optimal (or estimated optimal) RD-costs of adjacent macroblocks and selecting the estimated mode as an estimated optimal mode if the RD-cost of the estimated mode of the current macroblock is less than or equal to m times the mean value, wherein m is an integer equal to or greater than 1;

a member recalculating an RD-cost using a mode having the second optimal possibility if the RD-cost of the estimated mode of the current macroblock is greater than m times the mean value; and a member comparing the RD-cost of the latter mode to the RD-cost of the first estimated mode if the condition is not satisfied by the recalculation member, and if the the RD-cost of the first estimated mode is similar to the RD-cost of the second estimated mode, ending the mode decision calculation, if the RD-cost of the first estimated mode is not similar to the RD-cost of the second estimated mode, repeating the calculation by the recalculation member.

4. The apparatus of claim 3, wherein the mode estimator of the table management unit comprises:

a member indexing a mode history table using modes of macroblocks adjacent to a current macroblock and for which mode calculation has been performed;

a member providing a mode having the highest score from among modes recorded in a mode estimation sequence field of the mode history table;

a member determining whether an RD-cost of the mode having the highest score passes an optimization judgment code of the mode estimation optimization judgment unit and providing a mode having the second highest score if it is determined that the RD-cost of the mode having the highest score does not pass the optimization judgment code; and a member arranging and storing estimated modes of each field in the order of the number of selections as an RD-cost optimal mode if the RD-cost passes the optimization judgment code or if all modes are checked.

5. The apparatus of claim 3, wherein the estimated mode updater of the table management unit comprises a member calculating an RD-cost for all modes if all estimated modes cannot pass the RD-cost optimization judgment code in a previous estimation process, selecting an optimal mode, and storing the result in a corresponding mode estimation sequence field.

6. The apparatus of claim 3, wherein the estimated mode updater of the table management unit comprises a member increasing a mode selection count stored in the mode estimation sequence field by 1 when one of a plurality of stored modes is provided as an estimated mode and passes the RD-cost optimization judgment code, and rearranging modes in the mode estimation sequence field in the order of the number of selections.

7. The apparatus of claim 3, wherein the estimated mode updater of the table management unit comprises a member calculating an RD-cost of all modes and selecting and recording an optimal mode in a case where no mode is input when a table is indexed using modes of blocks adjacent to a current macroblock.

8. A method of estimating an H.264 compression mode, the method comprising:

in order to estimate a mode of a current macroblock from input macroblock coordinates, setting mode history tables, each comprising a mode history indexing field and a mode estimation sequence field corresponding to each indexing field; and a table management process, which comprises estimating a mode using the mode history tables and updating a mode stored in a table to the estimated mode;

a macroblock image characteristic calculation process, wherein a macroblock image characteristic is calculated from macroblock image information, and the macroblock image characteristic calculation process comprises:

obtaining variance of pixel values in a macroblock in order to calculate the evenness of the macroblock from input macroblock image information; and an evenness classification process, wherein a number of a mode history table is determined by dividing the calculated macroblock evenness by n and outputting this 1/n-classified evenness as a mode history table selection signal, wherein n is an integer equal to or greater than 1.

9. The method of claim 8, wherein the mode history tables are respectively set for n levels classified by the evenness classification process.

10. A method of estimating an H.264 compression mode, the method comprising:

in order to estimate a mode of a current macroblock from input macroblock coordinates, setting mode history tables, each comprising a mode history indexing field and a mode estimation sequence field corresponding to each indexing field; and a table management process, which comprises estimating a mode using the mode history tables and updating a mode stored in a table to the estimated mode;

a mode estimation optimization judgment process, wherein Rate Distortion(RD)-cost is calculated for the mode estimated in the estimating of the mode and an optimal mode is selected in order to prevent the spread of errors of the estimated mode, and the mode estimation optimization judgment process comprises:

determining whether an RD-cost of an estimated mode of a current macroblock is greater than m times a mean value of optimal (or estimated optimal) RD-costs of adjacent macroblocks and selecting the estimated mode as an estimated optimal mode if the RD-cost of the estimated mode of the current macroblock is less than or equal to m times the mean value, wherein m is an integer equal to or greater than 1;

recalculating an RD-cost using a mode having the second optimal possibility if the RD-cost of the estimated mode of the current macroblock is greater than m times the mean value; and comparing the RD-cost of the latter mode to the RD-cost of the first estimated mode if the condition is not satisfied by the recalculation member, and if the the RD-cost of the first estimated mode is similar to the RD-cost of the second estimated mode, ending the mode decision calculation, if the the RD-cost of the first estimated mode is not similar to the RD-cost of the second estimated mode, repeating the calculation by the recalculation member.

11. The method of claim 10, wherein the estimating of the mode in the table management process comprises:

indexing a mode history table using modes of macroblocks adjacent to a current macroblock and for which mode calculation has been performed;

providing a mode having the highest score from among modes recorded in a mode estimation sequence field of the mode history table;

determining whether an RD-cost of the mode having the highest score passes an optimization judgment code in the mode estimation optimization judgment process and providing a mode having the second highest score if it is determined that the RD-cost of the mode having the highest score does not pass the optimization judgment code; and arranging and storing estimated modes of each field in the order of the number of selections as an RD-cost optimal mode if the RD-cost passes the optimization judgment code or if all modes are checked.

12. The method of claim 10, wherein the updating of the mode in the table management process comprises, if all estimated modes cannot pass the RD-cost optimization judgment code in a previous estimation process, calculating an RD-cost for all modes, selecting an optimal mode, and storing the result in a corresponding mode estimation sequence field.

13. The method of claim 10, wherein the updating of the mode in the table management process comprises, when one of stored modes is provided as an estimated mode and passes the RD-cost optimization judgment code, increasing a mode selection count stored in the mode estimation sequence field by 1 and rearranging modes in the mode estimation sequence field in the order of the number of selections.

14. The method of claim 10, wherein the updating of the mode in the table management process comprises, in a case where no mode is input when a table is indexed using modes of blocks adjacent to a current macroblock, calculating an RD-cost of all modes and selecting and recording an optimal mode.

15. A non-transitory computer readable recording medium storing a computer readable program for executing the method of claim 8.

16. A non-transitory computer readable recording medium storing a readable program for executing the method of claim 9.

17. A non-transitory computer readable recording medium storing a readable program for executing the method of claim 10.

18. A non-transitory computer readable recording medium storing a readable program for executing the method of claim 11.

19. A non-transitory computer readable recording medium storing a readable program for executing the method of claim 12.

20. A non-transitory computer readable recording medium storing a readable program for executing the method of claim 13.

21. A non-transitory computer readable recording medium storing a readable program for executing the method of claim 14.

* * * * *